UNITED STATES PATENT OFFICE.

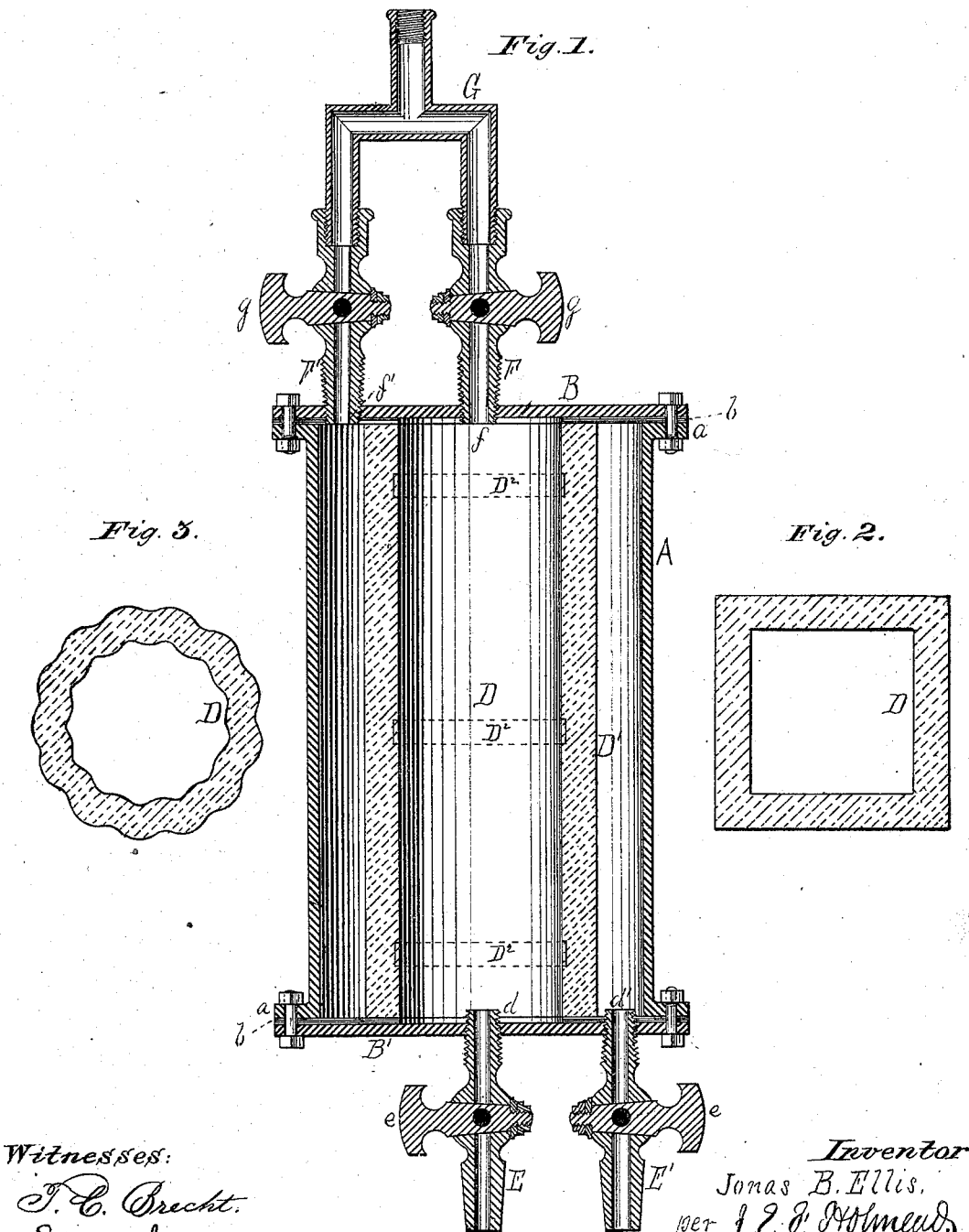

JONAS B. ELLIS, OF WASHINGTON, DISTRICT OF COLUMBIA.

IMPROVEMENT IN FILTERS.

Specification forming part of Letters Patent No. 142,217, dated August 26, 1873; application filed July 17, 1873.

*To all whom it may concern:*

Be it known that I, JONAS B. ELLIS, of Washington city and District of Columbia, have invented certain new and useful Improvements in Filters, of which the following is a full, clear, and exact description, reference being had to the accompanying drawing and the letters of reference marked thereon, making part of this specification, in which—

Figure 1 is a vertical sectional view. Figs. 2 and 3 are top-plan views of different styles of cylinder.

The object of my invention is to provide a cheap, simple, and practical filtering device, and one that is to be attached to or connected directly with the main or hydrant, and is to be operated through the pressure of the aqueduct or other supply-reservoir. Although in my improvement the filtering medium is an interior cylinder, I dispense with felt, flannel, &c., which soon become impregnated with foul matter, and are difficult to cleanse, and employ a solid permanent material, and one in which the filtration takes place at the surface, and therefore can be cleansed and rinsed at pleasure. The nature of my invention consists in securing in an outer case or cylinder, constructed of any suitable material, an inner tube or cylinder, and which is the filtering medium, constructed of sand and clay mixed and well baked. The relative diameters of the outer case and inner filtering-cylinder are to be such that when the latter is secured in proper position there shall be left an annular chamber, into which the water from the hydrant or main enters, and which is filtered by permeating or passing through the pores of the wall of the clay cylinder, and throughout its entire length, and from the interior chamber of which it is drawn off, having, in its passage through the wall of said cylinder, been freed from all foul matter. The heads or lids of these cylinders are each provided with two openings so arranged that when the heads are properly secured in position one set of openings shall lead into or be connected with the chamber of the inner cylinder, and the other set shall lead into and be connected with the annular chamber between the cylinders. These two inlet-openings in the upper lid of the filter permit of its being connected with the hydrant or main by two independent tubes, one leading into the annular chamber formed around the clay cylinder, and supplies the water that is to be filtered, the other leading into the interior chamber of the clay cylinder, and which, when desired, permits of the water from the hydrant being drawn at pleasure, and without being caused to pass through the filtering medium; and, besides, this arrangement of tubes provides the necessary means of rinsing and cleansing the entire interior surface of the filtering device; or the operation may be reversed, and, instead of filtering from the annular chamber into the inner chamber of the clay cylinder, the water to be filtered may be drawn into the inner chamber of the clay cylinder and filtered by passing through into the outer annular chamber. If found necessary, the inner cylinder may be strengthened by one or more bands around its outside surface.

The construction and operation of my invention are as follows: A is the outer case or cylinder, which may be constructed out of any suitable material, and of any desired dimensions. This outer case is formed with flanges *a a*. B is the upper and B′ the lower head of the cylinder, and rest on and are suitably bolted to the flanges *a a*. *b b* are disk-plate washers, constructed of rubber or other suitable material, and are secured between the flanges *a a* and the rim of the heads B B′, and extend entirely over the openings at the ends of the clay cylinder, forming a water-tight joint. These washers *b b*, in connection with the pressure-bearing of the heads B B′, serve to retain the inner cylinder D in a true vertical position. This cylinder D is constructed of sand and clay, mixed and baked in a manner similar to that in which the ordinary brick is burnt. The dimensions and diameter of this cylinder should be such that when secured at or near the center of the case it will leave an annular chamber, and will also be of such height as to permit of its being retained and held by the pressure of the heads B B′ and washers *b b*, as described. There is nothing arbitrary about the form of this cylinder. It may be round, as shown in Fig. 1, square, as shown in Fig. 2, or corrugated, as shown in Fig. 3, or of any other desired form.

The great advantage of this arrangement of cylinder is that the composition used is not only one of the purest, best, and most cleanly of all filtering mediums, but with my arrangement, in comparatively a limited space, I secure the utmost possible amount of filtering-surface. To illustrate: If my cylinder is twelve inches high and four inches outside diameter I have nearly one hundred and fifty superficial inches of actual filtering-surface.

In the head B' are two openings, $d$ $d'$, to which are attached the discharge-nozzles E E', which are provided with cocks $e$ $e$. These openings $d$ $d'$ are relatively so arranged that while the opening $d$ leads into the inner chamber formed by the cylinder D the other opening, $d'$, leads into the annular chamber D'. The openings $f f'$ in the head B are connected with tubes F F', which are provided with cocks $g$ $g$, and are connected with or extend from the T-shaped branch-pipe G, which is connected with the main or directly attached to the hydrant. The opening $f$ is directly opposite the opening $d$, and consequently communicates with the chamber which the cylinder D forms. The opening $f'$ communicates with the annular chamber $D^1$. $D^2$ $D^2$ are bands, of any suitable metal, which encircle the outside of the cylinder D for the purpose of strengthening the same, if necessary. Any other equivalent device which will answer the same purpose may be used in place of the bands $D^2$ $D^2$.

The operation is as follows: The T-shaped branch-pipe G is attached to the main or service pipe and the cock $g$ in the pipe F' is opened. This allows the water in its impure state to fill the annular chamber D'. To filter it the water percolates the cylinder D, and is drawn off, by means of the cock $e$ in the discharge-nozzle E, in a pure state.

To clean the filtering-surface of the cylinder D the cock $g$ in the pipe F and the cock $e$ in the discharge-nozzle E' are opened, when the water will fill the chamber formed by the cylinder D, percolating the cylinder and passing off from the annular chamber D' through the discharge-nozzle E'.

To cleanse the annular chamber B', or to allow of the free and uninterrupted discharge from the hydrant, the cock $g$ in the pipe F' and the cock $e$ in the discharge-nozzle E' are both opened, allowing the water to flow freely through the chamber D'.

What I claim as new, and desire to secure by Letters Patent of the United States, is—

The outer case A and inner cylinder D, the latter constructed of a composition of sand and clay baked and burned, and the heads or lids B B', having openings $d f$ and $d' f'$; the whole being constructed, combined, and arranged to operate substantially as described.

In testimony whereof I have signed my name to this specification in the presence of two subscribing witnesses.

J. B. ELLIS.

Witnesses:
EDWIN JAMES,
W. A. BOSS.